(12) United States Patent
Gulunov

(10) Patent No.: US 9,068,830 B2
(45) Date of Patent: Jun. 30, 2015

(54) LASER LEVELING DEVICE

(76) Inventor: Alexey V. Gulunov, Chelyabinsk (RU)

( * ) Notice: Subject to any disclaimer, the term of this patent is extended or adjusted under 35 U.S.C. 154(b) by 194 days.

(21) Appl. No.: 13/992,940

(22) PCT Filed: Nov. 14, 2011

(86) PCT No.: PCT/IB2011/002697
§ 371 (c)(1),
(2), (4) Date: Sep. 13, 2013

(87) PCT Pub. No.: WO2012/073081
PCT Pub. Date: Jun. 7, 2012

(65) Prior Publication Data
US 2013/0340268 A1    Dec. 26, 2013

(30) Foreign Application Priority Data

Dec. 3, 2010  (RU) ................................. 2010149879

(51) Int. Cl.
*G01C 5/02*     (2006.01)
*G01C 15/00*    (2006.01)
*G01C 15/10*    (2006.01)

(52) U.S. Cl.
CPC ............ *G01C 15/004* (2013.01); *G01C 15/105* (2013.01)

(58) Field of Classification Search
CPC .. G01C 15/004; G01C 15/105; G01C 15/008; G01C 15/002; G01C 15/10

USPC ............................. 33/290, 291, 391, DIG. 21
See application file for complete search history.

(56) References Cited

U.S. PATENT DOCUMENTS

| | | | |
|---|---|---|---|
| 6,762,830 B1* | 7/2004 | Connolly ...................... | 356/138 |
| 2012/0327662 A1* | 12/2012 | Dang et al. .................... | 362/259 |
| 2015/0029489 A1* | 1/2015 | Metzler et al. ............... | 356/4.01 |
| 2015/0042977 A1* | 2/2015 | Siercks et al. ............... | 356/4.01 |
| 2015/0062568 A1* | 3/2015 | Vanneman et al. ........... | 356/138 |

\* cited by examiner

*Primary Examiner* — G. Bradley Bennett
(74) *Attorney, Agent, or Firm* — John Alumit

(57) ABSTRACT

A laser-leveling device having a at least one radiation module and mounting module, where laser radiation sources and the prisms for developing planes from the laser beams are combined in the radiation module. The radiation module with housing contains a device for horizontal fine adjustment, an additional power supply with control, and an additional self-leveling support plate for receiving the laser radiation sources and prisms for developing the planes from the laser beams The mounting module with housing contains a self-leveling support plate, power supply with control, and a mount for securing to a tripod. The housing of the at least one radiation module and the housing of the mounting module are embodied such that the radiation module can be coupled to the mounting module, and it is possible to connect at least one additional radiation module.

5 Claims, 5 Drawing Sheets

LASER LEVELING DEVICE

CROSS-REFERENCE TO RELATED APPLICATION

This present application claims the benefit of PCT Application Number PCT/IB2011/002697 filed Nov. 14, 2011. The earliest priority filing date claimed is Dec. 3, 2010.

FEDERALLY SPONSORED RESEARCH

Not Applicable

SEQUENCE LISTING OR PROGRAM

Not Applicable

BACKGROUND

The invention relates to the construction of surveying equipment and in particular to laser devices for constructing planes. Such laser devices serve to perform planing jobs in the building field and can be used in installing technical equipment in mechanical engineering as well as in other scientific and technical fields for which the prerequisites include the use of light planes and the possibility of transfer (for translational motion) of marking in horizontal and vertical planes.

From the prior art, a laser-leveling device called the CrossLiner 2 Pocket is known. The device contains laser radiation sources, prisms for developing planes on the basis from the laser beams, and a self-leveling suspended compensation unit, which ensures the construction of the horizontal reference laser plane and the vertical reference laser plane.

However, this known laser-leveling device enables the construction only of a vertical plane and a horizontal plane. It cannot be used if it is necessary to slide markings between the walls.

In terms of its technical essence and the effect that can be attained, the prior art that comes closes to the subject of the present application and is thus the prototype of the present application is a laser leveling device having a self-leveling support plate with laser radiation sources placed thereon, prisms for developing planes from the laser beams, a laser plummet, a power supply and a controller, and a mount for securing to a tripod. The optical axis of the laser plummet extends via the center point of the mount. All the structural units are built into one common housing.

In this known laser leveling device, it is a disadvantage that all the complex, expensive components and structural units have to be solidly coupled to one another. They are built into a common housing and cannot be separated into complementary function modules (supplementing one another). It is therefore not possible to equip the laser leveling device to suit an intended use. Consequently, the intrinsic costs of this laser leveling device are higher. Moreover, the known laser-leveling device has rather large dimensions and is heavy.

It is an object of the invention to develop a user-friendly multifunctional device of modular design. Equipping the device with modules and the choice of modules should be done to suit the intended use of the laser-leveling device and should not require any special exertion of force of any special costs. This is meant to ensure the enhancements of its usage properties.

Another object of the present invention is to broaden the available selection of technical means that ensure both the construction of several planes and their disposition relative to one another.

The technical outcome of the invention is that the leveling device is divided up into at least one radiation module and one mounting module. The modules are embodied such that various modules can be coupled with one another, and that the radiation modules can also be coupled together. The number of modules is determined by the set of tasks that are to be accomplished.

SUMMARY

The stated object of the present invention is attained as follows. The known laser leveling device includes a self-leveling support plate with laser radiation sources placed on it, prisms for developing planes from the laser beams, a laser plummet, a power supply and a controller, and a mount for securing to a tripod. The optical axis extends via the center of the mount.

According to the invention, the laser radiation sources and the prisms for developing planes from the laser beams are combined into at least one radiation module. The radiation module has a housing, with the following elements also built into it: a device for horizontal fine adjustment, an additional power supply and a controller, and an additional self-leveling support plate for receiving the laser radiation sources and the prisms for developing the planes from the laser beams. The laser plummet with the self-leveling support plate, the power supply, and the controller, as well as the mount for securing to a tripod are combined into a mounting module. The mounting module is provided with a housing. The housing of at least one radiation module and the housing of the mounting module are embodied such that the radiation module can be coupled to the mounting module, and that it is possible to connect at least one additional radiation module.

Patent searches and research in scientific and technical sources are evidence that the laser leveling device of the invention is neither known, nor can be read from the prior art studied; that is, the proposed laser leveling device is novel and is based on an inventive step.

The laser leveling device of the invention can be produced in any arbitrary facility that specializes in this field, since what are required for it are known materials and standardized equipment that are widely produced both domestically and in foreign countries.

Thus the laser-leveling device of the invention is industrially applicable.

In addition, the following are also built into the housing in which the laser radiation sources and prisms for developing the plane from laser beams are combined into at least one radiation module: a device for horizontal fine adjustment; an additional power supply and a controller; and an additional self-leveling support plate for placement of the laser radiation sources and prisms for developing the plane from laser beams.

As a result, a module is produced which can be widely used both as a tripod-alone device and as a supplementary unit. Its use as a supplementary unit is appropriate if there is a need to expand the usual laser leveling devices. This enhances the usage properties of the laser leveling devices and broadens their functionalities.

Combining the laser plummet with the self-leveling support plate, the power supply and the controller, along with the mount for securing to a tripod all in the mounting module and installing that component in an individual housing make it possible to produce a module that can be used as a tripod-alone device and as an accessory in the range of available laser leveling devices. This, too, enhances the usage properties of the laser leveling devices and broadens their functionalities.

The housing of at least one radiation module and the housing of the mounting module are embodied such that the radiation module can be coupled to the mounting module, and that it is possible to connect at least one additional radiation module. Such an embodiment makes it possible, without the expenditure of force or finances, to equip the laser-leveling device with those functional units that are necessary for particular applications and jobs. The usage properties of the laser leveling devices are improved considerably thereby, and their dimensions, weight, and intrinsic cost can all be varied.

Thus all of the essential features, in their entirety, of the laser leveling devices according to the invention make it possible to attain the technical outcome state, specifically to divide the laser leveling device into at least one radiation module and a mounting module. The modules are embodied such that not only can various modules be coupled to one another, but the radiation modules can also be coupled together. The number of modules is determined by the set of tasks that are to be performed. Consequently, the stated object of the invention to enhance the usage properties of the laser leveling devices can be attained.

In a further advantageous embodiment of the invention, two radiation modules can be coupled to the mounting module. In further embodiments of the invention, the two radiation modules can be located either next to one another or opposite one another on the mounting module.

In a further advantageous embodiment of the invention, four radiation modules can be coupled, uniformly distributed, to the mounting module.

DRAWINGS

The invention will now be described in further detail in conjunction with the drawings. In the drawings.

DESCRIPTION

Figure 1:
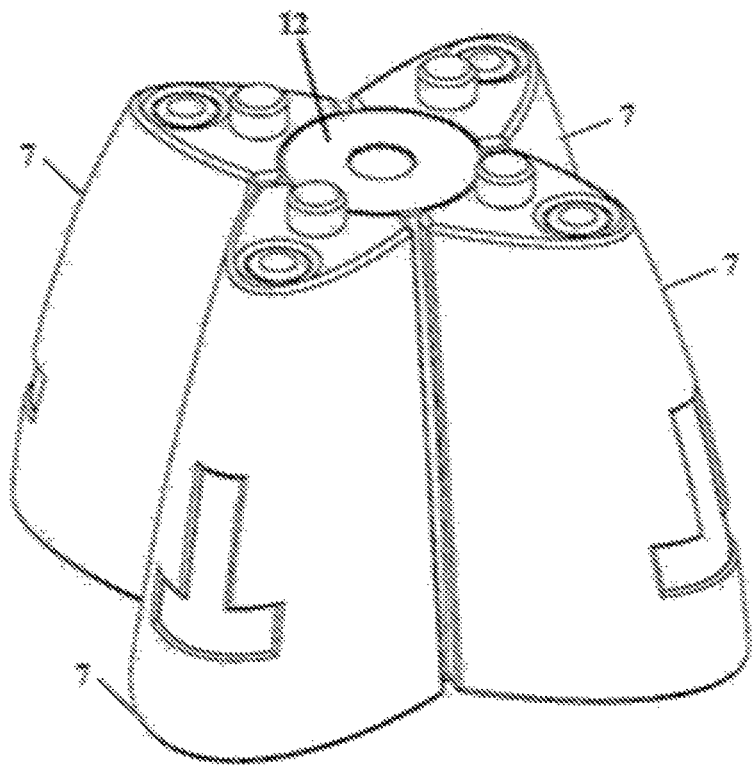
FIG. 1 is a perspective complete view of a laser leveling device with four radiation modules.
Figure 2:
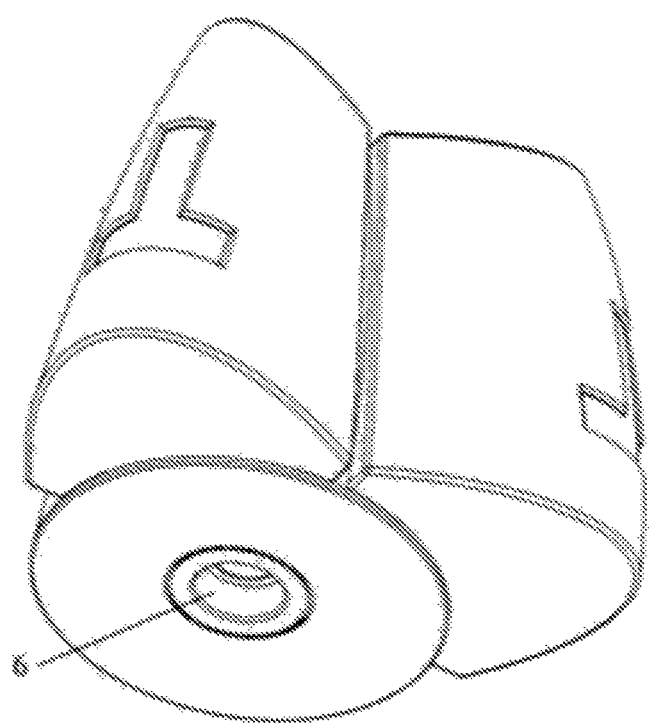
FIG. 2 is a perspective view of the laser leveling device of FIG. 1 from below.
Figure 3:
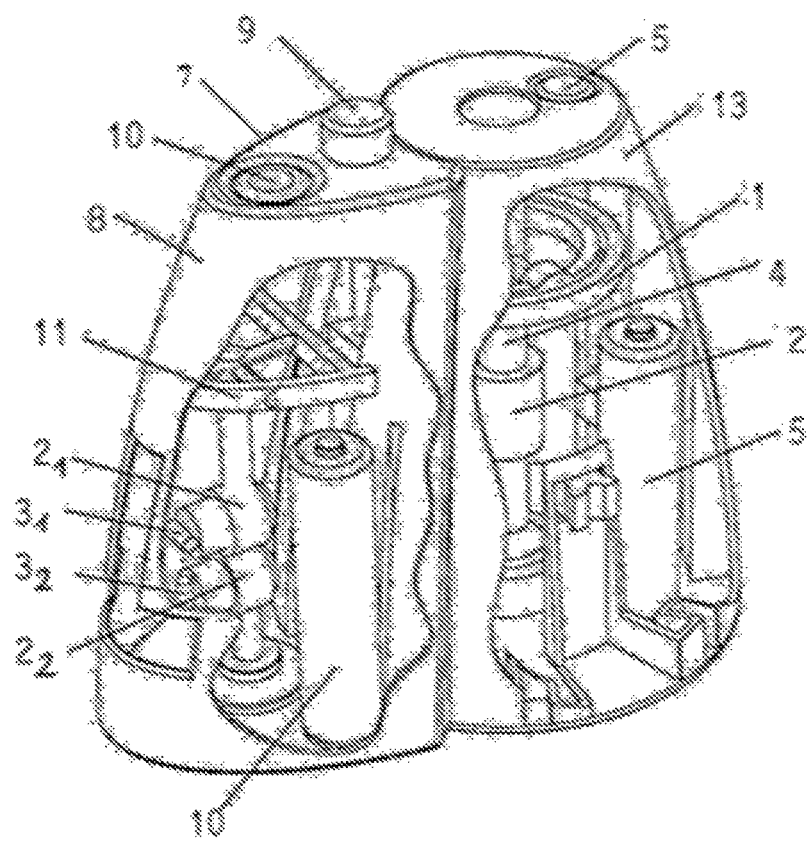
FIG. 3 is a perspective complete view of the laser leveling device of FIG. 1 with a radiation module, partially showing the components and structural units inside the housings of the modules.
Figure 4:
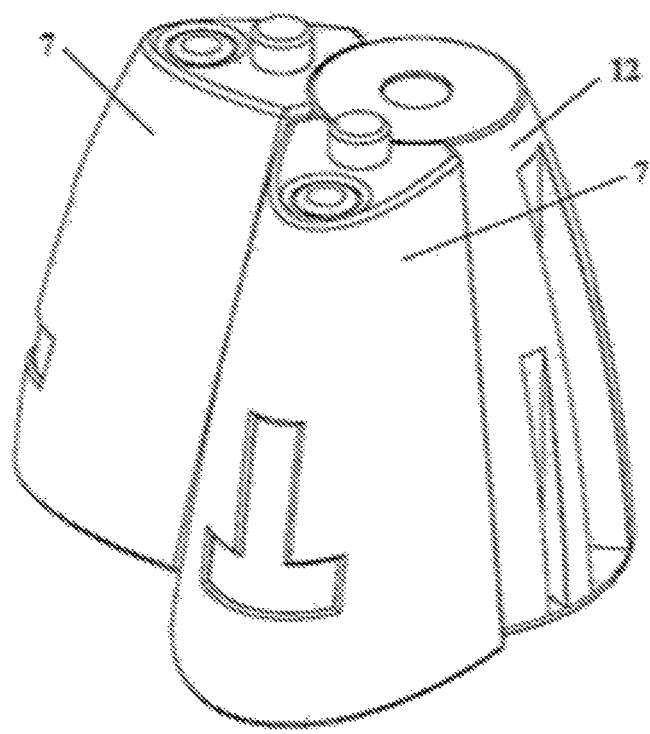
FIG. 4 is a perspective complete view of a laser leveling device with two radiation modules that are disposed next to one another.

As shown in FIGS. 1-5, a Laser Leveling Device comprises a radiation module 7 and mounting module 12. Referring to FIGS. 2-3, the laser leveling device includes a support plate 1 with a laser radiation source 2 placed on it; prisms $3_1$, $3_2$ for developing the plane from laser beams; and a laser plummet 4, a power supply 5 with a controller, and a mount 6 for securing to a tripod, not shown. The optical axis of the laser plummet 4 extends via the center of the mount 6. The laser radiation sources $2_1$, $2_2$ and the prisms $3_1$, $3_2$ for developing the plane from laser beams are combined in at least one radiation module 7. The radiation module 7 is provided with a housing 8, with the following additionally built into it: a device 9 for horizontal fine adjustment, an additional power supply 10 with a controller, and an additional self-leveling support plate 11 on which the laser radiation sources $2_1$, $2_2$, and the prisms $3_1$, $3_2$ for developing the plane from laser beams are placed. The laser plummet 4 with the self-leveling support plate 1, the power supply 5 with the controller, and the mount 6 for securing to the tripod are combined in a mounting module 12, which is provided with a housing 8 as best shown in FIG. 4. The housing 8 with at least one radiation module 7 and the housing 13 of the mounting module 12 are embodied such that the radiation module 7 can be coupled to the mounting module 12, and that the connection of at least one additional radiation module is possible.

The laser leveling device is used as follows.

In the operating mode for planing jobs together with orthogonal marking (placement of orthogonal characters) in vertical and horizontal planes, the laser leveling device of FIG. 4 is used. The mounting module 12 is secured to the tripod. After the device is switched on, the horizontal planes of light of the radiation units are adapted (placed one above the other) using the device 9 for horizontal fine adjustment. After that, the marking jobs are performed.

Figure 5:
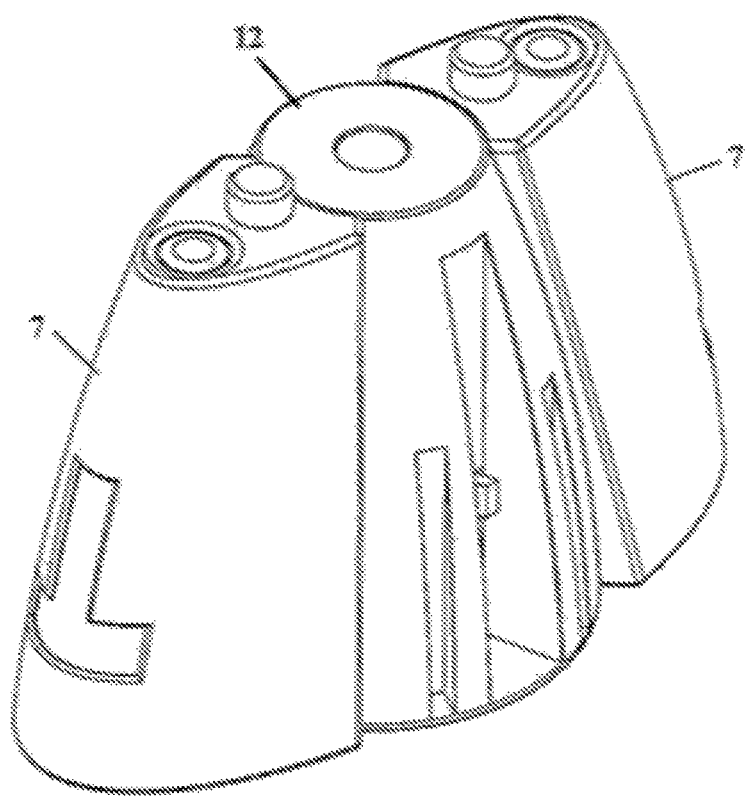
FIG. 5 is a perspective complete view of a laser leveling device with two radiation modules that are disposed opposite one another.

In the operating mode for planing jobs together with transferring the markings between the opposed walls, the laser leveling device of FIG. 5 is used. The radiation module 12 is secured to the tripod. Two radiation modules 7 are secured, opposite one another, to the mounting module. After the device is switched on, the horizontal planes of light of the radiation modules 7 are placed one above the other, using the device 9 for horizontal fine adjustment. After that, the marking jobs are performed.

When four radiation modules 7 are built onto the mounting module 12 of FIG. 1, it is possible to scan a complete circle in the horizontal and the vertical planes of light, which is sufficient for all kinds of surface marking jobs.

The described makeup of the laser-leveling device makes it possible to use not only the radiation modules 7 but also the mounting module 12 separately.

Thus in transferring a marking point from the floor to the ceiling, for example, it is sufficient to mount only the mounting module 12 on the tripod. In that arrangement, the mounting module 12 has the function of the laser plummet.

To construct the vertical plane and the horizontal plane, it suffices to place only the radiation module 7 on the surface.

What is claimed:

1. A laser leveling device, comprising:
   a) at least one self-leveling support plate (1) with at least one laser radiation source (2) placed thereon;
   b) at least one prisms (3) for developing at least one plane from the laser radiation source;
   c) a laser plummet with an optical axis (4), a power supply (5) with control, and a mount (6) for securing to a tripod, the optical axis of the laser plummet (4) extending via the center of the mount (6), wherein the laser radiation sources ($2_1$, $2_2$) and the prisms ($3_1$, $3_2$) for developing planes from the laser beams are combined in at least one radiation module (7);
   d) that the radiation module (7) is provided with a housing (8), with the radiation module further comprising: a device (9) for horizontal fine adjustment, an additional power supply (10) with control, and an additional self-leveling support plate (11) for receiving the laser radiation sources ($2_1$, $2_2$) and the prisms ($3_1$, $3_2$) for developing the planes from the laser beams;
   e) that the laser plummet (5), the self-leveling support plate (1), the power supply with control, and the mount (6) for securing to a tripod are combined in a mounting module (12), which is provided with the housing (8); and f) that the housing (8) of the at least one radiation module (7) and the housing (13) of the mounting module (12) are embodied such that the radiation module (7) can be coupled to the mounting module (12), and the connection of at least one additional radiation module (7) is possible.

2. The laser leveling device according to claim 1, wherein two radiation modules (7) can be coupled to the mounting module (12).

3. The laser leveling device according to claim 2, wherein the two radiation modules (7) are located next to one another on the mounting module (12).

4. The laser leveling device according to claim 2, wherein the two radiation modules (7) are located opposite one another on the mounting module (12).

5. The laser leveling device according to claim 1, wherein four radiation modules (7) can be coupled, uniformly distributed, to the mounting module (12).

* * * * *